United States Patent [19]

Wei

[11] Patent Number: 5,367,637
[45] Date of Patent: Nov. 22, 1994

[54] SELF-TUNING VIRTUAL STORAGE MANAGEMENT FOR DEDICATED REAL-TIME COMPUTER SYSTEM

[75] Inventor: Shuang N. Wei, Rockville, Md.

[73] Assignee: International Business Machines Corporation, Armonk, N.Y.

[21] Appl. No.: 860,745

[22] Filed: Mar. 26, 1992

[51] Int. Cl.$^5$ .............................................. G06F 1/00
[52] U.S. Cl. ..................................... 395/250; 395/425; 395/600; 364/DIG. 2
[58] Field of Search .......................... 364/254.3, 254.9; 395/250, 600, 425

[56] References Cited

U.S. PATENT DOCUMENTS

| | | | |
|---|---|---|---|
| 4,047,243 | 9/1977 | Dijkstra | 364/200 |
| 4,523,276 | 6/1985 | Maejima et al. | 364/200 |
| 4,736,318 | 4/1988 | Delyani et al. | 364/200 |
| 4,775,932 | 10/1988 | Oxley et al. | 364/200 |
| 4,797,810 | 1/1989 | McEntee et al. | 364/200 |
| 4,805,097 | 2/1989 | De Sanna | 364/200 |
| 4,908,750 | 3/1990 | Jablow | 364/200 |
| 4,912,629 | 3/1990 | Shuler, Jr. | 364/200 |
| 4,914,577 | 4/1990 | Stewart et al. | 364/200 |
| 4,916,608 | 4/1990 | Shultz | 364/200 |
| 4,967,353 | 10/1990 | Brenner et al. | 364/200 |
| 5,125,086 | 6/1992 | Perazzoli, Jr. | 395/425 |
| 5,134,711 | 7/1992 | Asthana et al. | 395/800 |
| 5,237,661 | 8/1993 | Kowamura et al. | 395/250 |

OTHER PUBLICATIONS

IBM Technical Disclosure Bulletin, vol. 15, No. 12, May 1973, pp. 3730–3733 by Anderson, et al., "Software Monitor for Performance Tuning a Virtual Memory Computer System".

Primary Examiner—Dale M. Shaw
Assistant Examiner—Gaurav Bhatia
Attorney, Agent, or Firm—William A. Kinnaman, Jr.; Mark A. Wurm

[57] ABSTRACT

A self-tuning and efficient computer method is disclosed for the management of virtual storage applicable to dedicated real-time computer systems. This method interposes a layer between the application and the real-time computer system to form a two-layered structure to meet an application's request for virtual storage (i.e. buffer request). The method adds a real-time system's slower allocation (second layer) to guarantee the creation of all other buffers during one real-time period. The self-tuning first layer is checked first to satisfy a buffer request, while the untuned second layer is entered to create a buffer when the first layer fails; either the request size is not yet tuned, or the pre-allocated buffers have run out. These entrances to the second layer provide a monitoring mechanism from which a new pre-allocation definition, based on the system usage history, is derived to tune the first layer at the next initialization time. This method also monitors "storage leaks" in which buffer pre-allocations are repeatedly insufficient because some repetitive requests are unmatched by corresponding free requests.

5 Claims, 4 Drawing Sheets

| FIRST LAYER | SECOND LAYER | COMMENTS |
|---|---|---|
| DOESNOT-FIT COUNTER | N/A | ADD 1 WHEN REQUEST SIZE > MAX BUCKET SIZE |
| BUCKET-1 | | |
| ALLOCATION COUNT<br>DEALLOCATION COUNT | SAME <-35<br>"  <-37 | ADD 1 PER BUFFER "GET"<br>ADD 1 PER BUFFER "FREE" |
| BUCKET-2 | | |
| ALLOCATION COUNT<br>DEALLOCATION COUNT | SAME<br>" | ADD 1 PER BUFFER "GET"<br>ADD 1 PER BUFFER "FREE" |
| ⋮ | ⋮ | OTHER BUCKETS OF INCREASED SIZES |
| BUCKET-N | | |
| ALLOCATION COUNT<br>DEALLOCATION COUNT | SAME<br>" | ADD 1 PER BUFFER "GET"<br>ADD 1 PER BUFFER "FREE" |

FIG.4

| FIRST AND SECOND LAYERS | COMMENTS |
|---|---|
| ⋮ | ⋮ |
| BUCKET-N | ONE ENTRY PER BUCKET |
| ALLOCATION COUNT | ADD 1 PER BUFFER "GET" |
| DEALLOCATION COUNT | ADD 1 PER BUFFER "FREE" |
| MAX REQUEST SIZE | |
| ACCUMULATED PEAK | SUM UP THE DELTA BETWEEN ALLOCATION AND DEALLOCATION COUNTS COMPUTED AT EVERY "GET" NO ACCUMULATION AT "FREE" TIME. |
| MAXIMUM PEAK | BIGGER OF (ALLOC − DEALLOC) AND (MAXIMUM PEAK) COMPUTED AT EVERY "GET". |
| POOR-FIT STATISTICS | |
| ⋮ | ⋮ |
| IMAGINARY LARGEST BUCKET (LAST BUCKET) | EVER-PRESENT |

FIG.5

SELF-TUNING VIRTUAL STORAGE MANAGEMENT FOR DEDICATED REAL-TIME COMPUTER SYSTEM

BACKGROUND OF THE INVENTION

1. Technical Field

The invention disclosed broadly relates to the virtual storage management of real-time computer systems and more particularly, relates to a self-tuning and efficient method for virtual storage management on dedicated real-time computer systems.

2. Background Art

Complex computing systems such as those employed in air traffic control impose many demands on the virtual storage of a computer system. Air traffic control is a process of using radar and other electronic detection techniques to locate and track aircraft flying through pre-determined airspace, to monitor assigned position, coordinate courses to prevent intersection collisions and near-misses and to advise on course corrections to avoid collisions, adverse weather conditions, and for other reasons. A real-time, networked distribution data processing system is designed to process and to integrate the aircraft's measured altitude data, the detection data from multiple radar stations, weather data, and background data (flight information, maps and routes) for screen display to the air traffic controller. Data or buffers flowing through the network and processing facilities represent many virtual storage allocation and deallocation requests during the existence of the data in the system. Stringent system response time and availability requirements under high volume of data, demand an efficient and fast virtual storage manager. In addition, variation of load and functions among each air traffic control site and types of machines translate into different virtual storage requirements. Future function enhancements and changing missions dictate the need for a flexible virtual storage manager. To tune each site/machine becomes costly and impractical. Therefore, what is needed is a method to tune each site/machine automatically to achieve fast allocation/deallocation of virtual storage without interfering with the operation of the real-time computing system.

OBJECTS OF THE INVENTION

It is therefore an object of the invention to interpose a fast virtual storage allocation/deallocation layer between the application program and the real-time computing system.

It is another object of the invention to provide a self-tuning algorithm for optimum performance under different operational scenarios based on the history and usage of the system.

It is another object of the invention to provide low performance overhead while tuning the system and negligible performance overhead when the system is tuned.

It is another object of the invention to provide a means to verify the correctness of the tuning decisions automatically.

It is another object of the invention to provide a means to contain virtual storage waste to an acceptable level.

It is another object of the invention to provide a "storage leak" detection mechanism to prevent address space crashes.

It is yet a further object of the invention to provide a means to identify large size buffer requesters for later analysis.

SUMMARY OF THE INVENTION

These objects, features and advantages are accomplished by the present invention operating on a dedicated real-time computer system. The self-tuning and efficient virtual storage method interposes a layer between the application program and the real-time computer system to form a two-layer structure to meet the application's request for virtual storage. The method adds a fast allocation first layer without a guaranteed buffer, allowing the real-time system's slower allocation second layer to guarantee the creation of all other buffers during one real-time period. The self-tuning first layer is checked first to satisfy a buffer request while the untuned second layer is entered to create a buffer when the first layer fails to meet the request because the request size is not yet tuned or any pre-allocated buffers have run out. The entrances to the second layer provide a monitoring mechanism from which a new pre-allocation definition based on the system usage history is derived to tune the first layer at the next initialization period. This method also monitors "storage leaks" in which buffer pre-allocations are repeatedly insufficient because some repetitive requests for storage are unmatched by corresponding requests to free storage.

BRIEF DESCRIPTION OF THE DRAWINGS

These and other objects, features and advantages of the invention will be more fully appreciated with reference to the accompanying figures.

FIG. 4 is a table showing collected statistics for each bucket.

FIG. 5 is a table showing accumulated statistics for each bucket.

DESCRIPTION OF THE BEST MODE FOR CARRYING OUT THE INVENTION

Figure 1A:
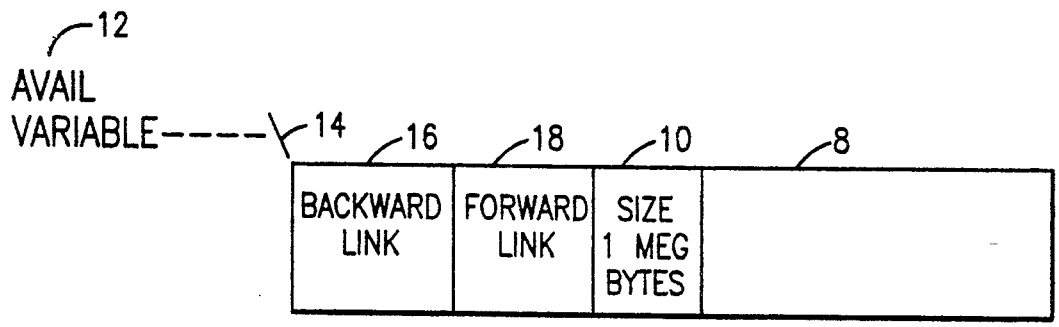
FIGS. 1A and B are schematic drawings of a one-size-fits-all HEAP implementation for virtual storage management.
Figure 1B:
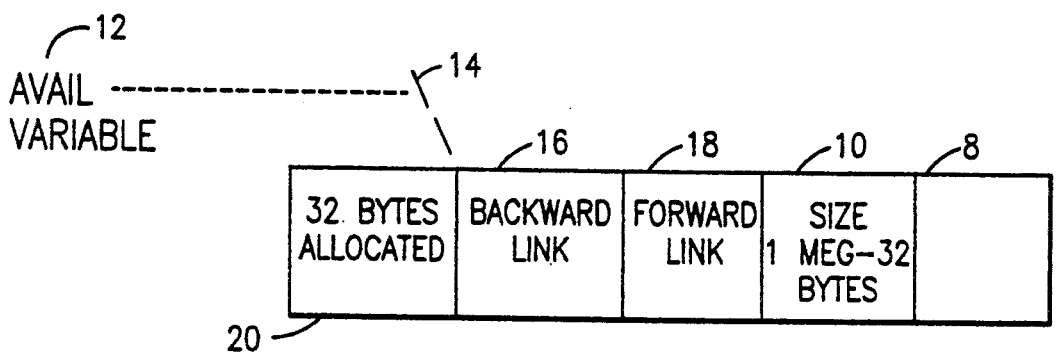

An example of HEAP or buffer management for virtual storage is the one-size-fits-all approach. Shown in FIG. 1A is a one megabyte storage element 8 that is to be allocated between requesting storage needs. The AVAIL variable 12 is the anchor which points to the first available free space 14. The backward and forward links 16 and 18 are used to chain together free spaces while the size field 10 indicates the size of each free space. The links and size fields are part of each free space and are usable when given to a storage requester by the HEAP manager. They are re-established when storage is returned to the HEAP. To satisfy a user request for a 32 byte buffer, one starts at AVAIL 12 and follows the forward link 18 to locate a free space whose size field 10 is great than or equal to the request. Afterwards, the storage element 8 looks like that shown in FIG. 1B. The AVAIL variable now contains new anchor location 14 due to the allocated 32 byte element 20 and the size field 10 is 32 bytes less than the one megabyte storage available for allocation.

To free the allocated 32 byte buffer, one starts at the AVAIL variable 12 and follows the forward link 18 to locate the first free space whose address is greater than the given buffer pointer. The buffer is linked into the free space chain and merged if possible with the adjacent free spaces to form the largest free space possible. The size field is adjusted accordingly. When this is done, the storage element 8 returns to its initialization as shown in FIG. 1A.

The one-size-fits-all approach for HEAP management is very simple. It allows for storage extension toward higher address storage areas and satisfies any buffer usage pattern. A disadvantage is very serious performance degradation which stems from the simplistic one-size-fits-all approach. Depending upon the buffer free space distribution, searches for a buffer following the forward link can be very costly. Page faults and cache misses are very likely to happen due to touching of link chain pointers within the free unused space.

Figure 2:
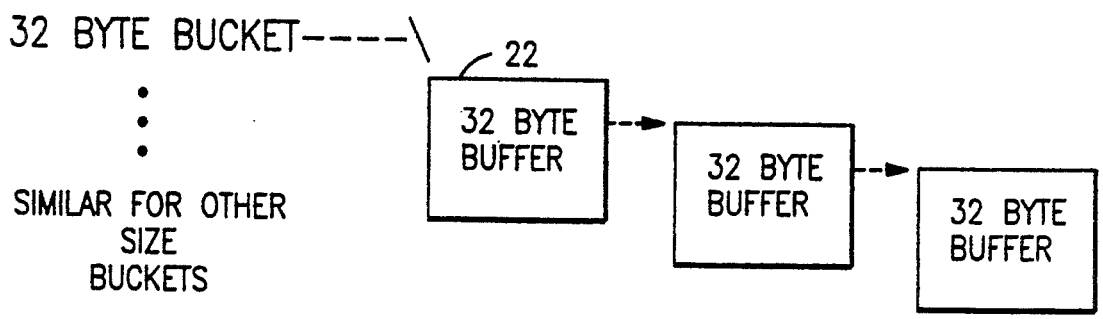
FIG. 2 is a schematic drawing of an alternative bucket HEAP implementation for virtual storage management.

An alternative HEAP implementation is the bucket approach shown in FIG. 2. During HEAP initialization several different sized buffer pools or buckets, each containing a number of singly linked buffers, are allocated. Subsequent buffer allocation or deallocation requests will be satisfied by popping or pushing the pre-allocated buffers 22 on or off the right-sized bucket. This method works by finding a buffer whose size is equal to or greater than the requested size. The bucket index is stored in the buffer and is intended to avoid bucket searching when the buffer is deallocated.

An advantage of this bucket approach is that it is an order of magnitude faster than the one-size-fits-all approach. A disadvantage of the approach is in supplying the necessary and correct information about the bucket sizes and the number of buffers in each bucket to the HEAP initialization.

The best approach is to take advantage of the speed of the bucket approach interposing it between the application and the underlying real-time computer system to form a two-layered HEAP scheme.

Figure 3:
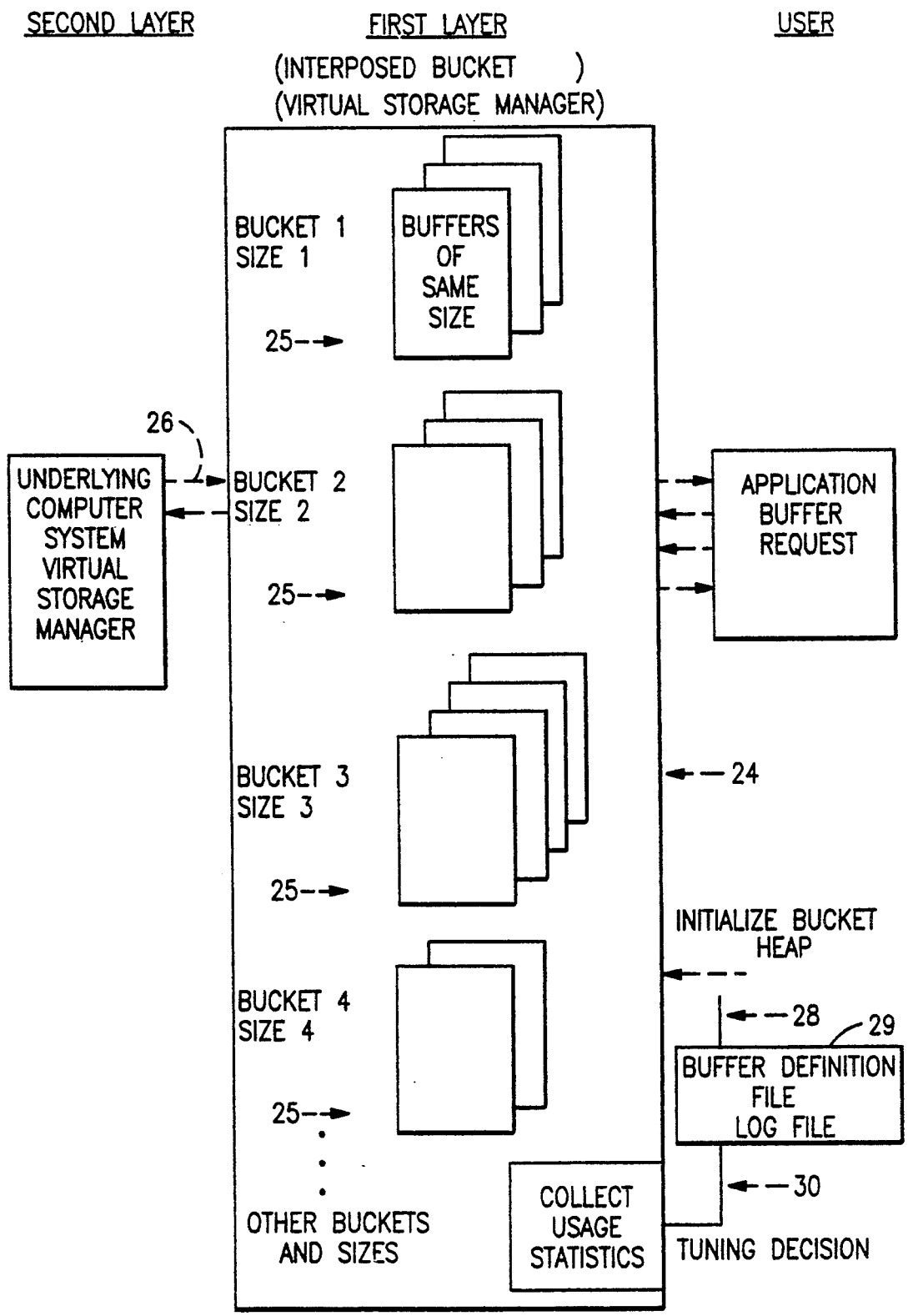
FIG. 3 is, according to the present invention, a schematic drawing of the interposed HEAP implementation for virtual storage management.

FIG. 3 depicts the structure of the interposed first layer which is composed of several different sized "buckets," each containing a number of singly linked pre-allocated buffers. Allocation requests are first checked for buffer availability against the bucket first layer 24. If available, an allocation request is satisfied by popping a pre-allocated buffer 25 off the right size bucket that is big enough to meet the size of the request. The bucket index, part of the buffer but transparent to the requester, is used during a deallocation request to push the buffer 25 onto the right bucket without searching. If unavailable, the second layer 26 of the underlying real-time system is entered to satisfy an allocation request and subsequent deallocation request.

The goals of tuning the interposed first layer are to reduce trips to the second layer of the underlying real-time system and to minimize bucket poor-fit to within an acceptable level. The goals are achieved by an iterative process of automatically monitoring and tuning the system in three areas. The three areas are the number of buckets, the bucket sizes and the number of buffers in each bucket based upon the operational history of virtual storage usage.

First, individual bucket tuning involves continuous counter update at each allocation or deallocation request as shown in FIG. 4. The does-not-fit counter 32 counts the times when the request size is greater than the maximum bucket size. The corresponding layer allocation count 34 or 35 and deallocation count 36 or 37 for each bucket is incremented by one per buffer allocation and deallocation respectively. The same is done for each of the various buckets 39 starting from 1 to n.

From the first and second layer allocation counts, a ratio is defined as "bucket goodness level" which equals the first layer allocation count 34 divided by the second layer allocation count 35. The bucket goodness level, computed periodically, one for each bucket, is the "monitor trigger" and reflects the ratio of buffer requests satisfied by the first and second layers. The higher the goodness level, the better because it means fewer trips to the slow second layer to satisfy a buffer request. A goodness level of less than or equal to nine, turns monitoring on to trigger the collection of statistics. A goodness level greater than nine implies that more than 90 percent of the requests are satisfied by the fast first layer, thus this bucket is exempted from monitoring and statistics collection. A goodness level greater than or equal to 99 triggers statistics collection to fine tune a bucket to correct for too generous amount of initial pre-allocations.

When the monitoring is on, the first layer also collects statistics for both layers shown in FIG. 5. For each allocation, a one is added to the allocation count 40. For each deallocation, a one is added to the deallocation count 42. For each allocation, the sum of the delta between the allocation and deallocation counts is added to the accumulated peak 46. The bigger of maximum peak 48 and allocations count 40 minus deallocation count 42 is computed and updated if necessary at every allocation. The maximum request size 44 is also checked and updated.

To start the HEAP management according to the present invention, the number of buckets is set to 23 with sizes in bytes of 16, 24, 40, 64 and on, 12,776, 20,672, continuing on to 370,944, 600,200. The sizes are derived by summing the two immediate smaller sizes. This scheme favors the small-size-bucket density more than a power of 2 scheme and is intended to minimize the fragmentation of small buffers in the second layer. This scheme also speeds up the rate of convergence to an optimum buffer allocation definition best suited for each individual central processing unit. Initially, the number of buffers in each bucket is set to zero to trigger the data collection monitoring.

Depending upon the number of buffers in a bucket and the nature of requests, the goodness level begins to exhibit stability around a certain value. As time progresses, this value becomes increasingly resistant to temporary fluctuations and converges to a final value. A large sample of requests is ideal but not necessary. The tuning decision, on a bucket-by-bucket basis, is made at every 1,000 requests. At that time, the bucket goodness level mentioned earlier is computed to determine the monitor on/off status of the particular bucket. Also, the collected statistics are used to compute a new bucket definition which is written to each address space's own file 30 to be read at initialization 28 time to complete the iterative tuning process. Specifically, new bucket size = max request size 44 (this will only result in downgrading a bucket size and possibly in eliminating a bucket - zero max request size)

$$\text{total buffer numbers}(tbn) = \frac{\text{(first \& second layer accumulated peaks 46)}}{\text{(first \& second layer allocation counts 40)} + 5\% \text{ of (first \& second layer max peaks 48)}}$$

To correct the poor-fit situation or to reduce virtual storage waste, a "bucket-split" or create a new bucket algorithm is employed. The waste is in virtual storage and is primarily concentrated among large buckets. The algorithm, based up the poor-fit statistics 50, is explained by using the example following:

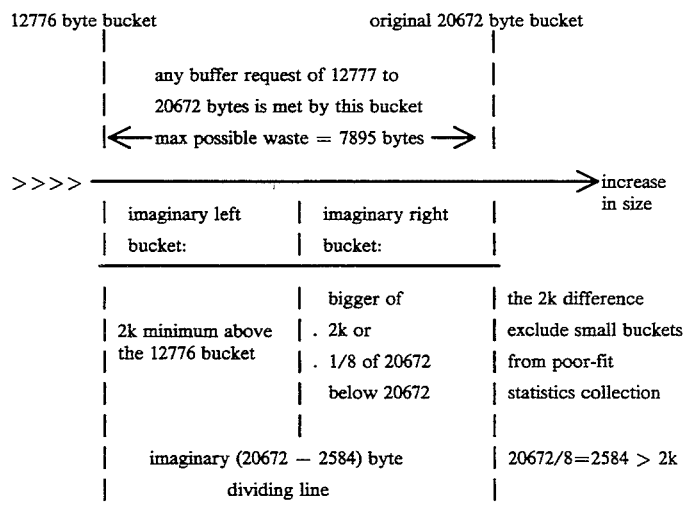

The dividing line is computed from the bucket size (right end). The left bucket is whatever is left over, which will be more than 2k by excluding small bucket sizes from this algorithm.

In addition to the original bucket statistics, the following are also collected for the "imaginary" left and right buckets. The left and right buckets do not exist and are created imaginarily to collect respective statistics upon which the "bucket-split" results could have been measured, had it actually been two separate buckets.

|  | denoted by: |  |
|---|---|---|
| max request size | same | lmax, rmax |
| allocation count | same | lall, rall |
| deallocation count | same | ldea, rdea |
| accumulated peak<br>(sum of lall − ldea) | same<br>(sum of rall − rdea) | lacc, racc<br>at every buffer request |

At tuning decision time, the following buffer numbers are computed:

$lbn = lacc/lall$, $rbn = racc/rall$, $tbn = \frac{\text{first and second layer accumulated peaks 46}}{\text{first and second layer allocation count 40}}$ The possible exemplifying results are:

| case | left imaginary bucket (lbn) | right imaginary bucket (rbn) | whole bucket (tbn) |
|---|---|---|---|
| 1 | 0 | 1 | 1 |
| 2 | 3 | 3 | 3 |
| 3 | 4 | 2 | 5 |
| 4 | 2 | 4 | 6 | case 1 in good shape already—just downgrade bucket size to rmax.

case 2 indicates that the buffer requests fall mainly into either the left bucket or the right one or mixed but not more than three at one time on average. Just downgrade the original bucket size to rmax, no bucket-split; otherwise, there is more waste (instead of three buffers, six are needed).

cases 3 and 4 have the possibility of saving storage. The judgement is based upon:

$lbn*lmax + rbn*rmax$ vs $tbn*rmas$

When there is potential for storage saving, two constraints are imposed and must be met before making a bucket-split decision:

$((rmax - lmax) >= 2k) > (rmax/8)$ ($\frac{1}{8}$ is the generally acceptable waste limit)

$(tbn*rmax - (lbn*lmax + rbn*rmax))/rmax >= 1$ or $tbn*rmax - (lbn*lmax + rbn*rmax) >= 64k$ bytes
(saves at least one buffer or 16 4k-pages)

The above constraints exclude bucket-split among small size buckets and limits the total number of buckets in the interposed first layer. It is to be noted that all initial bucket sizes have a maximum possible waste of approximately 40 percent.

To compensate for the non-increasing-bucket-size nature of each bucket, a "largest bucket" algorithm is employed. This is accomplished by designating one "imaginary largest bucket 52" after the largest existing "real" bucket to collect statistics for all "does-not-fit" buffer requests. At tuning decision time, the imaginary-largest-bucket size and the number of buffers are computed from the collected statistics the same way as other real monitored buckets except with the following added constraint:

if (imaginary largest bucket−largest real bucket size)>(2k bytes or ⅛ of largest real bucket size, whichever is bigger then, combine the two buckets to create a new largest bucket with a size of the imaginary largest bucket else, convert the imaginary largest bucket into a "new" largest "real" bucket.

The above process, applied to each bucket independently from others, will converge, as time progresses, to a scenario best fitted to each individual central processing unit based on the history of virtual storage usage.

The following points are to be noted about the operation of the present HEAP manager.

Accumulated statistics are kept for each bucket only in "goodness level = <9 or > =99" periods.

Since the tuning decision is based upon the history of accumulated statistics, not only is there a built-in resistance to new tuning but also a built-in smoothing/filtering characteristics.

At user request, via the bucket definition file 29, the monitor can be instructed to log a user specified number of allocations/deallocations with time, size and address for later manual analyses to independently compare and verify the automatic tuning decision.

With the storage fragmentation being taken care of by the present algorithm, two other causes of system instability are also handled semi-automatically by the present HEAP manager.

Storage leak is where no corresponding deallocation is matched with each allocation results in the ever widening gap between the first and second allocation count and deallocation count. The first action must be to increase the buffer allocation.

After a history of increases, the leak becomes very suspect. Proof of leak in a bucket requires logging all buffer "gets" with address and requester, and logging all buffer "frees" with address. Sorting the log by address and time and discarding paired consecutive "get-free" leaves a residue of unfreed "gets" with a predominant requester who is likely the storage leaker. The decision of when to sort the log is a programmer choice. Address space failure, in general or "storage error" is a good indication. The automated monitor can only decide to start logging when threatened with another buffer increase after a history of prior increases.

High volume of large buffer requests trigger the logging of the requester and the size for later analysis and questioning.

Although a specific embodiment of the preferred invention has been disclosed, it is to be understood by those having skill in the art, that changes can be made to the specific implementation without departing from the spirit and the scope of the invention.

What is claimed is:

1. A method of providing a self-tuned virtual storage manager on a dedicated real-time computer system comprising the steps of:

interposing a virtual storage allocation/deallocation layer between a data processing application and the real-time computer system;

reading from the interposed layer a HEAP definition file to select a number of memory buffer pools and a number of buffers in each pool;

allocating the selected number of buffer pools and the selected number of buffers in each pool; collecting statistics regarding the usage of the buffers and the buffer pools; and tuning the interposed layer based on the collected statistics, the tuning comprising the steps of:

incrementing a counter for each buffer allocation/deallocation within the interposed layer;

computing a ratio of the interposed layer allocation count to the underlying real-time system usage for every 1000 allocation requests;

monitoring the collected statistics collection when the ratio computed is less than nine or greater than 99;

computing buffer pool size and quantity and number of buffers in each pool;

determining the need to create or reduce buffer pool size and quantity and number of buffers in each pool; and updating the HEAP definition file.

2. The method of claim 1 wherein the virtual storage manager automatically verifies the correctness of the tuning decisions comprising the steps of:

running a known virtual storage application as a test pattern; and comparing the resulting HEAP definition obtained to a previously known standard HEAP for that test pattern.

3. A system for self-tuning virtual storage on a real-time computer comprising:

an allocation/deallocation layer interposed between a data processing application and the real-time computer;

means for selecting a number of buffer pools and a number of buffers in each pool;

means for allocating the selected number of buffer pools and the selected number of buffers in each pool;

means for collecting statistics regarding the usage of the buffers and the buffer pools; and means for tuning the interposed layer to self-tune the virtual storage, the tuning means comprising:

means for incrementing a counter for each buffer allocation/deallocation within the interposed layer;

computing means for determining the ratio of the interposed layer allocation count to the underlying real-time system usage for every 1000 allocation requests;

means for monitoring the collected statistics collection when the ratio computed is less than nine or greater than 99;

computing means for determining buffer pool size and quantity and number of buffers in each pool;

means for determining the need to create or reduce buffer pool size and quantity and number of buffers in each pool; and means for updating the HEAP definition file.

4. The system of claim 3 having semi-automatic means to detect "storage leaks," comprises logging buffer address and requester when the difference between allocation and deallocation requests reach a preselected value.

5. The system of claim 3 having semi-automatic means to identify large size buffer requesters comprising logging buffer allocation requests larger than a preselected size.

* * * * *